Oct. 13, 1936.                A. H. DREUX ET AL                2,057,293
                                   PAPER BOX
                         Filed Oct. 28, 1935        2 Sheets-Sheet 1
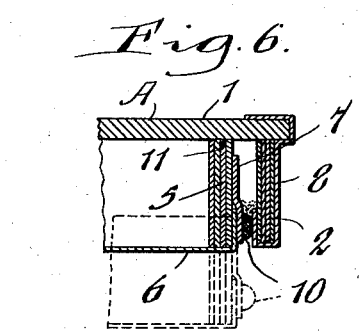
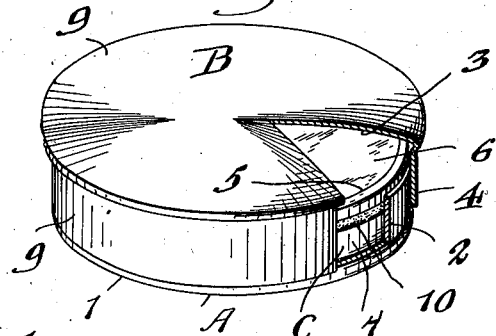
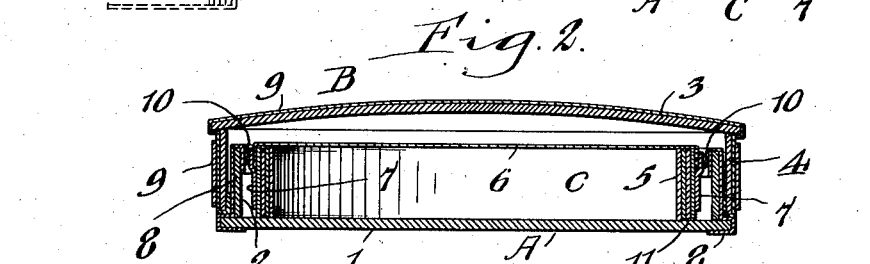
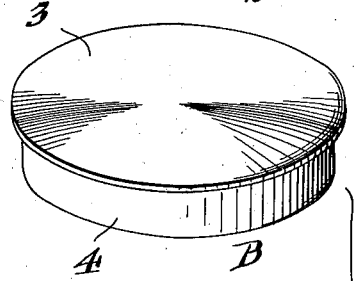
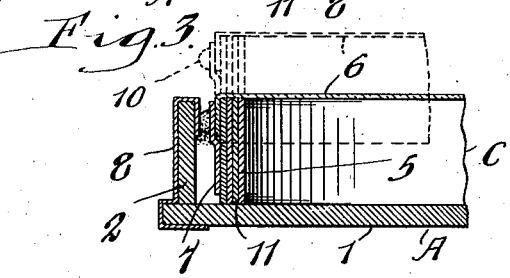
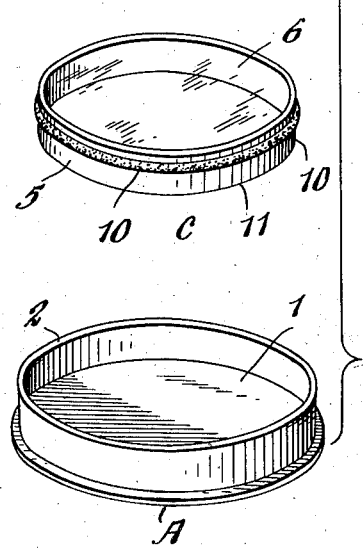
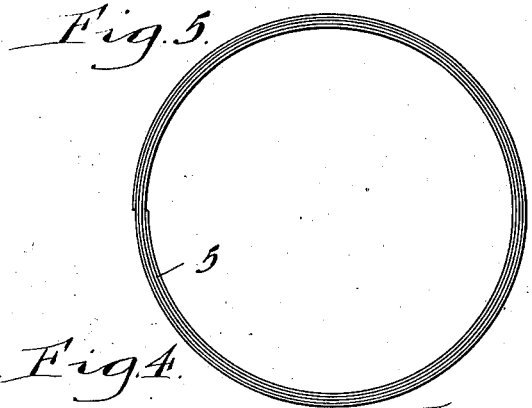
Inventors,
Alexander H. Dreux
Joseph N. Royal
by J. W. Anderson,
Attorney.

Oct. 13, 1936.  A. H. DREUX ET AL  2,057,293
PAPER BOX
Filed Oct. 28, 1935   2 Sheets-Sheet 2

Inventors,
Alexander H. Dreux
Joseph N. Royal
by J. W. Anderson,
Attorney.

Patented Oct. 13, 1936

2,057,293

UNITED STATES PATENT OFFICE 2,057,293

PAPER BOX

Alexander H. Dreux, Orchard Park, and Joseph N. Royal, Buffalo, N. Y., assignors to F. N. Burt Company Limited, Toronto, Ontario, Canada, a corporation of Ontario, Canada Application October 28, 1935, Serial No. 47,139

4 Claims. (Cl. 93—55.1)

This invention relates to containers for finely divided solid material and especially to face powder boxes utilizing an inner powder receptacle or powder drum which is to be filled with the powder and inserted in the base of the box.

One important object of the invention is the provision of a simple and practical construction by which discharge of powder from the box is confined to the regular discharge opening of the box, its egress or sifting thereof from the box through the box joints being greatly minimized or entirely prevented.

Another object of the invention is the provision of an improved practical and efficient construction of the box parts which lends itself to the rapid production by automatic machinery of siftless powder boxes.

Another important object of the invention is the provision of a simple and efficient construction of powder container drum which due to its improved features is highly promotive of the production of a siftless box and which may readily and easily be inserted in place in telescopic relation in the base, notwithstanding variations of the relative diameters between the drum and the interfitting base, which are normally encountered under different conditions of manufacture, such as, different degrees of moisture in the stock, different quality and thickness of stock, etc.

Another object of the invention is the provision of a simple and practical improved method for making non-sifting face powder boxes.

Another important object of the invention is the provision of a practical construction of powder box in which the powder material is adapted to cooperate to form a packing for arresting exit of powder from the box through the box joints.

It is a further object to provide an improved means of overcoming the manufacturing difficulties normally met in the inherent variation in the size, or more specifically the diameter of the container parts manufactured on high-speed production machines with particular regard to those parts that must fit within each other in the assembly of the complete parts.

It is a further object to provide a means of avoiding failure and other difficulties in the assembly of container parts due to the variation in finished part size, which is occasioned by variations in the thickness of the several plies of stock used in making the parts of a round, square, rectangular, or multi-sided box or container.

Other objects of the invention will in part be obvious and will in part appear hereinafter.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a perspective view, partly sectional, of a face powder box with its cover and illustrating one of the preferred embodiments of the invention;

Fig. 2 is a central vertical section through the box of Fig. 1;

Fig. 3 is an enlarged vertical section of a portion of the box, the dotted lines illustrating the drum before being seated in position in the base of the box;

Fig. 4 is a view of the base, the cover and drum, each in perspective and in separated relation;

Fig. 5 is a partially diagrammatic plan view illustrating a ring made of a coiled strip of paper or similar material and which may be utilized either in the base or in the drum, the strip being shown as thicker than that which may normally be employed;

Fig. 6 is a detailed sectional view similar to Fig. 3, but showing a modified embodiment;

Figure 13:
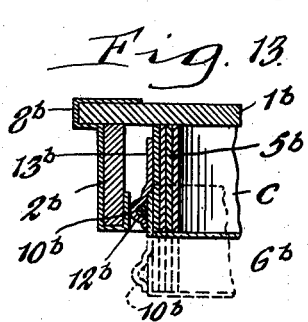
Fig. 13 is a fragmentary sectional view similar to Fig. 6 but showing the arrangement of the modified embodiment of Figs. 7 and 8.

Figs. 14, 15, 16, 17, 18, and 19 are fragmentary sectional views similar to Fig. 13 but showing further modified embodiments of the invention.

Referring now more specifically to the drawings, and first to the embodiment of Figs. 1 to 5 inclusive, the base of the box is indicated at A, the cover or top at B and the drum at C. The base has a head 1 and an upstanding flange or ring 2. Similarly, the cover B has a head 3, and a depending flange of ring 4 and the head 3 may be domed as illustrated. The drum provides a container for reception of face powder and has a flange or ring 5 and an overlying head 6. The head 6 may be readily frangible and made of cellulosic transparent sheet material, or of other sheet materials, as a light weight paper, as tissue paper. A sufficiently large sheet is selected and its margin or edge is folded onto the outside face of the drum-ring or flange 5, the fold being secured by an overlying strip of thin cover paper 7 extending continuously around the drum ring 5 and pasted to said ring. The cover strip not only secures the fold of the drum head 6; it also covers any small wrinkles in the fold and provides a relatively smooth, unwrinkled outside face of the drum flange or ring 5. For convenience of the powder maker, the base A, cover B and drum C are provided as separate units. The drum C is open at its end opposite or remote from the head 6, and the powder maker places it with its open end up so it may easily be filled with the powder. Thereupon after filling, the drum may be inserted in the base A, the flange or ring 2 becoming an outer ring and the flange or ring 5 becoming an inner ring. For finishing the base flange 2, and securing it to the head 1, a thin strip of ornamental paper or other material 8 may be wound onto the flange 2 and will be folded over the open edge of this flange and around onto the head 1, and adhesively secured inside and outside the base A. In like manner a finishing strip 9 may be affixed to the cover B, and entirely over the head 3.

The present invention is of advantage in hand made boxes inasmuch as among other factors, it promotes quick assembly of the parts and the making of a non-sifting face powder box, but it possesses very important advantages when utilized in paper boxes the parts of which are made by automatic machine operating at high speed. One of the most important objects sought for in a face powder box is that it shall not "sift"; that it shall be "siftless", meaning that the powdered contents shall be retained in the box and not sift out through its joints. As tending to avoid sifting, the diameters of the drum flange 5 and the base flange 2 have heretofore been of relative size to obtain as tight a fit as possible consistent with the requirement that one must be inserted in the other in telescopic relation. The result has been that in many cases the insertion may not be effected at all or only with the greatest care, thus leading to great loss of time and waste of materials, and increasing production costs and slowing down output. The high speed machines have thus often been impeded in the rapid production of merchantable boxes. They may run at high speed, but frequently when general manufacturing conditions are not just right, much of the product has to be rejected. Also, various supplemental operations at substantial cost have been resorted to, none of which has been fully satisfactory, especially in making a satisfactory powder box capable of being marketed at low cost.

Dependence upon the fit of the drum flange and the base flange for tightness has been entirely unsatisfactory. Supplemental operations of the past have been equally unsatisfactory in preventing or minimizing "sifting" and have but added to operations and to cost.

An important aspect of the present invention concerns the relative diameters of the inner and outer rings or walls provided for the base and drum respectively.

An important related feature of the present invention resides in providing an inner drum ring or flange of appreciably smaller outer diameter than the internal diameter of the outer base-ring, thus allowing a loose fit between the rings notwithstanding variation of moisture content or thickness of stock material, so that free entry of one ring into the other is readily permitted under all conditions, a space being thus always provided between the two rings in their telescopic relation to each other. The importance of this will become manifest from the following considerations:—

In modern, high speed, automatic box machines these rings are formed by coiling or winding relatively stiff, thin paper stock on rotating mandrels having fixed diameters. It has been the common practice to depend upon the closeness or tightness of the fit of the outer diameter of the drum ring, or flange, against the inner diameter of the base ring, or flange, to hold the powder in the box and to prevent sifting, i. e., escape of the finely divided particles out of the drum, and accumulation of substantial amounts in loose condition, on the top of the drum head and beneath the cover, especially before the cover is removed. It is a difference in diameter of but a few thousandths of an inch between the fit of the rings or flanges on each other that may result in sufficient looseness to sift powder or one that is so tight that these rings cannot be made to telescope. Drum rings or flanges are commonly made of two, three or more ply light weight paper, and while on the whole they are relatively stiff, they may have some flexibility, dependent on the paper stock and the number of plies employed. As has been before explained, the margin of the head 6 is folded down and a cover strip 7 may be applied. Accordingly, any predetermined outside diameter of the drum ring is dependent on several factors including the thickness of the paper stock and of the glue which may be employed to hold the plies together and to secure the cover strip. Assuming it to be the practice to purchase nine and one-half point card-middling stock from which to coil a four-ply drum ring, but such stock averages ten and one-half points in thickness instead of nine and one-half points, eight thousandths of an inch will be added to the outer diameter of the drum. And it is not uncommon to find even more variation, eight point to eleven point, affecting the outer diameter of the drum ring in paper stock of this small caliper. Not only is there this unavoidable variation in thickness or caliper of the paper stock which will result in a nontelescoping drum-ring; there are also variations in thickness due to moisture content of the stock, its thickness being one caliper when made and a different caliper when assembled drum to base. By providing the drum-ring of appreciably smaller outer diameter than the internal diameter of the base ring and having the loose fit as hereinbefore stated, the objections dependent on variations of stock-thickness for whatsoever reason are very substantially avoided and the production of siftless boxes at high speed on automatic machinery greatly promoted. This is especially so when taken in conjunction with the feature of the invention which arrests the escape of powder notwithstanding the rings are of appreciably different diameter as aforesaid. As illustrated in the drawings, the drum ring 5 is commonly formed of relatively stiff thin paper stock coiled in a plurality of plies, into ring formation, as shown in Fig. 5. Also it is to be understood that the ring or flange of the base may be constructed of a similarly coiled paper strip.

Another important aspect of the invention relates to adjusting or compensating for the looseness of fit between the drum ring and the flange ring so as to avail of the improvements due to the loose fit (as for instance free entry of one ring into another; avoidance of objections on account of variation in caliper of stock, whether due to moisture or to unavoidable variation in original stock material) and nevertheless to promote the anti-sift features of a non-sifting powder box. To this end a means is provided which is disposed and adapted to bring the diameters of the base flange or ring and the drum flange or ring to relative size producing a tight fit in the joint between the base and drum. Initially this means may be mounted either on the base or on the drum, but it is preferably initially mounted on the drum.

According to one embodiment of the invention as shown by way of example in Figs. 1 to 6, this compensating aspect of the invention includes plastic, joint-packing or caulking material 10 which is cooperable to join the flange walls or rings of the base and the drum together and, in the embodiment illustrated lies between said rings and is in the form of a continuous circumferential bead or ring around the drum ring 5. This elevation or bead 10 is of narrow width relative to that of the box rings and is spaced apart from the end 11 of the drum. It is preferably located close to the frangible head 6 of the drum and overlies the fold thereof. It adds to the stiffness of the drum and hence tends to hold the head 6 taut. When initially on the outer face of the separate drum flange of the inner face of the separate base flange, it protrudes therefrom, and its protruding portion is curved or convexed outwardly in cross-section, as clearly seen in Figs. 3 and 4, and forms a relatively narrow strip or bead projecting laterally of the flange.

The material of the ring or bead 10 is relatively soft and readily shearable and compressible and it is adapted to be altered in thickness by contacting with the base flange or ring under the force of seating the drum ring in its operable position in the base ring or flange. In the operation of telescoping the flanges 2 and 5, the bead or strip 10 is carried by one flange into such position that the other flange, forced to telescopic relation with the flange carrying the bead 10, will cause said bead tightly to pack or caulk the space between said flanges.

A suitable plastic material for the bead or ring 10 is some species of solid wax or wax-like substance, as blended wax. Preferably the ring 10 is bonded to the drum or base, which ever is the initial carrier, in a melted state. Under mild heat, it may be bonded to the other ring after a telescopic insertion in the other ring. The ring 10 forms an exterior layer on the box part, rising very slightly above the surface thereof, or somewhat more than half the maximum variation between the outer diameter of the drum flange and the inner diameter of the base flange.

In some instances it is desirable to utilize for the elevation or ridge 10 a species of plastic, as wax, to which particles of the face powder will adhere due to its tackiness, thus anchoring the powder particles to the wax substance, and to the paper—these particles tending to block any fine interstices in the wax packing and forming a packing of powdered material.

It is to be understood that either the base or drum having the wax or plastic bead 10 mounted thereon is utilizable alone as a separate article of manufacture for any convenient use.

In carrying out the method (according to the embodiment of the invention shown in Figs. 1 to 6,) the base flanges or rings are formed separately from the drum flanges or rings, and of relative size loosely to interfit, as above set forth. After the paper rings are made the interfitting face of one ring is provided with a plastic shoulder or conforming ring, as the packing ring 10 of wax or other plastic material which is thicker than the maximum variation of the space between said rings when the rings are in interfitting relation. This may be done by directing onto the drum while on its mandrel a stream of the melted, plastic material. This also bonds the plastic to the drum. Thereafter one ring, after being filled with powder, is pressed into the other and by the pressing or driving operation the conforming ring or shoulder is driven into position tightly packing the joint between the rings. The bead or ridge 10 being spaced some distance back from the leading or entering edge 11 of the drum as described, it will be seen that entry of the drum into telescopic relation with the base is promoted and made very easy. Thus the leading end of the drum is entered into telescopic relation with the base before the bead 10 enters into engagement with the base walls. This leading drum end being small enough in diameter to enter the base very readily and freely can quickly be placed in entering position, whereupon it functions as a guide to aid in positioning the base and drum with reference to each other during initial assembly thereof. After thus being placed in initial engaging position, the base and drum are forced together and as telescopic movement continues the bead or ridge enters and engages between the walls and reaches its final or home position at the same time that the drum does. By virtue of these improved features the box parts may be assembled much more rapidly than heretofore and jamming and imperfect aligning of the parts during assembly with consequent damage thereto are effectually avoided, resulting in a saving of labor and material and the production of a more nearly perfect box. Whether the conforming ring or bead 10 is placed on the drum flange or on the base flange, it extends continuously and uninterruptedly over the surface, thus forming an endless or annular conforming bead. After the drums are filled and inserted in the bases, a slight application of heat to the outside of the bases causes the plastic ring to bond to the flange of the base, thus also making a hermetic seal.

By employing a wax-like material having a relatively low melting point, as for instance paraffine, the wax-like ring 10 easily chills and solidifies so it may readily be handled, the ring offering a convenient shoulder or handle to lessen slip of the fingers. An important function of the plastic is to interrupt and form a non-sifting powder-barrier in the joint between the rings. It fills the space between the rings and also will mold itself into all irregularities of the space, as for instance formed by the ends or edges of the cover-paper, the folded margin of the head 6, and other irregularities. The plastic ring 10 is of a substance relatively soft and solid at room temperature, as for instance some species of wax, and the melting point of this substance is considerably lower than the point of inflammability or charring of the paper so that the substance may be bonded to the paper by the application of heat without injuring the paper. Also the substance may have some degree of viscidity or tackiness in the solid state so that particles of powder may adhere to the packing.

It is to be understood that among the substances of which the ring 10 may be made are the various waxes, such as paraffine, bees wax, halowax, carnauba, spermaceti, cerese or combinations of these waxes, or mixture of chlorodiphenyl and sulphur, the former comprising the larger percentage of the mixture. Bitumens or resinous materials might be used, or combination of bitumens and resins. It has been found to be advantageous to add carnauba to the paraffine to bring the melting point up to around 150 degrees F. and to add cerese to retain the plasticity.

In bases having non-flaring open ends, the diameter of the plastic ring 10 on the drum ring should be larger than that of the open end of the base ring so as to be compressed when forced past the edge of said open end, and if the bead 10 is considerably larger than the base ring, a portion may be sheared off from the plastic ring in the operation of telescoping the two rings. In either case tight interfitting of the ring 10 in the joint is effected. Due to the flaring open base ends, or to the convex surface of the bead 10 presenting a tapered entering edge, or to both of these features, there will be a wedging action as the bead enters the space between the base and drum rings. This wedging action results in a slight forcing of the ring walls away from each other against the resiliency thereof thus resulting in placing a permanent yielding pressure on the caulking bead to make a permanently tight sift-proof joint.

It is to be understood that the boxes need not be round as illustrated, but may be oval or polygonal or of any shape appropriate for embodying the invention. Accordingly it is to be understood that the terms "ring", "flange", etc. herein employed cover and comprehend similar walls for box parts whether they are oval, circular, square, hexagonal, or of other shapes.

It is to be understood that the packing or caulking bead 10 may in some instances be applied to the base flange instead of to the drum flange, or each of these parts may have an individual bead. The bead applied to the drum is more practical, however, and is to be preferred. It is also to be understood that, whereas a coiled or multi-ply flange is illustrated, the invention is available for flanges of single ply formation. Thin paper stock is preferred for the material of the flanges, but it is to be understood that the invention is available for boxes or box-flanges made of other materials, as pasteboard, card middle stock, and the like. Also in some instances the conforming ring or bead 10 is colored in contrast to the color of the flange to which it is applied, thus enabling its structure and arrangement to be more readily observed, and any defects noted and remedied.

Figure 7:
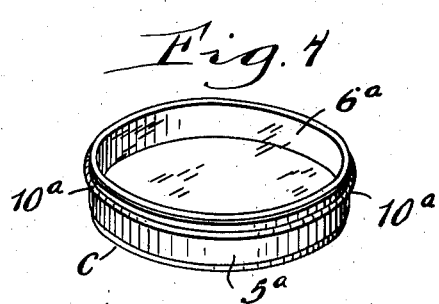
Fig. 7 is a perspective view of a box drum similar to that of Fig. 4 but showing a modified embodiment of the invention.
Figure 8:
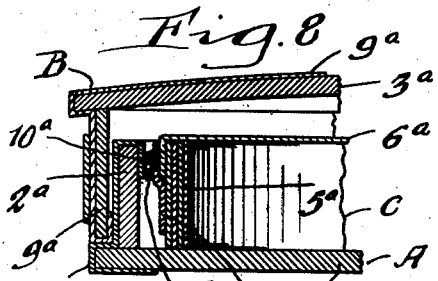
Fig. 8 is an enlarged fragmentary vertical radial section of a box in accordance with the embodiment of Fig. 7.
Figures 9, 10:
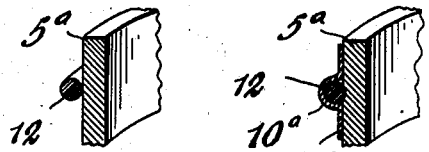
Figs. 9 and 10 are fragmentary sectional perspective views showing the arrangement of the caulking bead.

According to the embodiment of the invention as shown generally in Figs. 7 and 8, the box structure for the most part is the same as in the embodiment already described and the materials may also be the same, but in this case the caulking bead 10a is of modified structure and the material of which it is made is also different. The caulking bead 10a may be positioned as in the prior embodiment, either upon the drum flange 5a or upon the base flange 2a, being shown, however, as located upon the drum flange. This caulking bead 10a includes a string 12 which may be of some fibrous material, such as cotton, hemp, jute, linen, or the like. It may, for example, be a cotton twine string, and is yieldable to conform to the space available to receive the same between the walls of the drum and base. This space, as already described, will vary somewhat under varying conditions of manufacture, but the base and drum are constructed so that there will always be an appreciable space under all varying conditions, whereby the drum and base will telescope loosely with each other. Whether placed on the drum flange or upon the base flange, the caulking string 12 extends continuously throughout the extent of the flange of the body part and is attached in position on the surface thereof. There may be a single strand, as shown, or in some cases, there may be a multiple strand, that is, the string may extend more than once around the surface of the box part. The ends of the string may be attached in any appropriate manner, as, for example, tapering the ends and overlapping them. The overlapping, tapered ends may be attached together, as by an adhesive, such as wax or glue, and if desired the string itself may be impregnated with wax, or a wax-like substance of the nature above described. Also the caulking string may be provided in the form of an endless ring of sufficient diameter to fit snugly over the supporting surface. Also the ends of the string may be made to abut with each other. In any case, the caulking string may be attached in position either by adhesive or as shown by means of a binding strip 13, of paper or similar material, overlying the string and secured by an adhesive to the surface of the box part. Such an attaching medium holds the caulking bead or string in its correct position upon the box part, holds the ends of the string in correctly adjusted position to avoid bulges and irregularities, and is easily applied.

Figure 11:
Figs. 11 and 12 are fragmentary perspective views of two forms of the fibrous caulking string employed.
Figure 12:

The caulking string 10a provides a bead or ridge rising above the adjacent surface of the box part and presenting a convex engaging surface tapered off in wedge-like formation at the entering or forwardly directed edge thereof in a manner similar to that of the caulking bead above described, and for a similar purpose. The fibrous caulking string may be in the form of a cord having several strands twisted together, as indicated at 14 in Fig. 11, or the fibres may be untwisted as shown at 15 in Fig. 12. Other yielding materials may be employed in the construction of this caulking string, such, for example, as resilient rubber.

Figure 14:
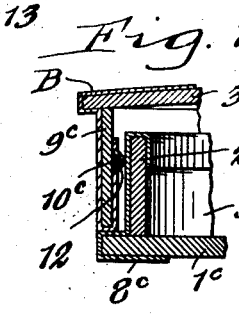

In the embodiment shown in Fig. 13, the structure is generally the same as in Figs. 7 and 8, but the caulking bead 10b is differently positioned upon the wall of the box drum. This caulking bead includes a string 12b held in position on the box part as above described by a strip 13b. The drum C is shown in partially telescoped position in dotted lines. In the embodiment of Fig. 14 the caulking bead 10c is constructed similarly to the bead 10a of Fig. 8, but is positioned upon the inner surface of the cover element B engaging with the flange of the base element A so as to caulk the space between these two elements.

Figure 15:
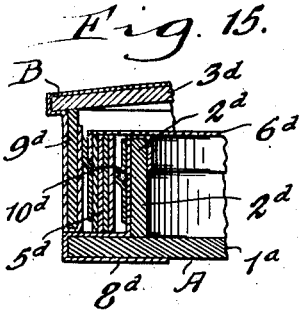

In Fig. 15 the box structure is somewhat different from that previously described, the base element A having the compartment for receiving the powder and having a wall or flange 2d upon the outer surface of which the caulking bead 10d is mounted. This caulking bead is constructed and arranged substantially as described above in connection with Figs. 7 and 8. The drum has a wall or flange 5d positioned outside of the flange 2d and also has a frangible head 6d attached to the flange 5d and overlying the top of the base flange 2d and the powder compartment. The caulking bead 10d cooperates between the two adjacent walls 2d and 5d to close the space between these two walls. The cover B slides down over the other assembled parts, as in Figs. 2 and 8.

Figure 16:
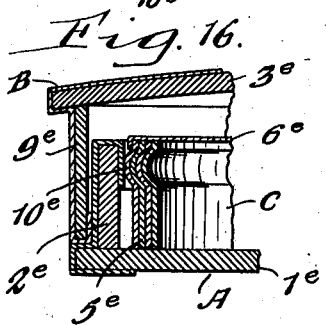
Figure 17:
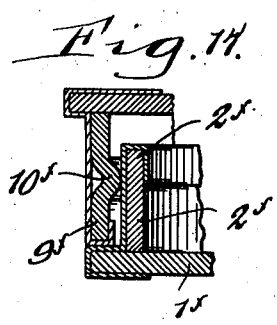
Figure 18:
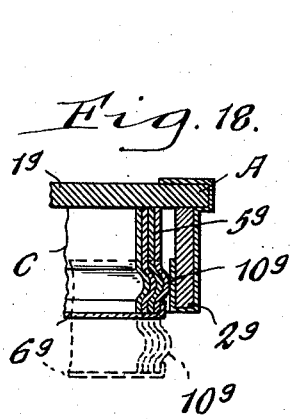
Figure 19:
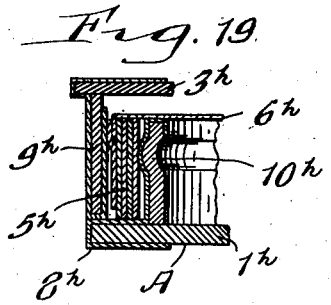

In the embodiments of Figs. 16, 17, and 18, the box structure is similar respectively to that of Figs. 8, 14, and 13. In Fig. 16, the caulking bead or elevation 10e is formed by crimping or offsetting the plies of the drum wall 5e so as to provide a yieldable and conformable caulking bead extending entirely around the wall of the drum. This caulking bead cooperates to close the space between the wall 5e of the drum and the wall 2e of the base, in the manner already described. In Fig. 17, the caulking bead 10f is formed by crimping the wall 9f so as to provide a caulking bead cooperating with the wall 2f, the construction of the caulking bead being otherwise similar to that of Fig. 16. The structure of Fig. 18 is similar to that of Fig. 13, but the caulking bead 10g is constructed by crimping the laminated wall 5g in a manner similar to that shown in Fig. 16. The structure of Fig. 19 is similar to that of Fig. 15, but the caulking bead 10h is constructed by crimping the wall of the base section A.

In all of the different embodiments of the invention, the caulking bead is yieldable and readily conformable to fill the space between the adjacent telescoping walls so as to effectually close this space against sifting of the powder and to maintain the base and drum in the correctly assembled relation in which they have been placed. This is true whether the caulking bead is constructed of a wax-like substance, of a fibrous material, or is formed by crimping the wall of the box part. It is advantageous in some cases, especially in larger size boxes, to superpose a wax bead, such as bead 10, upon the string type of bead such as shown in Figs. 7, 8, 9, and 10, either with or without the retaining strip 13. In this manner the string is embedded in the wax bead which is preferably continuous as in Figs. 1 to 5. Also in each case as above described the caulking bead presents a surface rounded or convexed outwardly away from the surface to which it is attached, thus facilitating entry of the caulking bead into the space between the adjacent telescoping walls when the box parts are moved into telescopic engagement with each other. It will be clear furthermore that the bead or ridge in each of the different embodiments is preferably positioned so as not to enter into the space between the walls until after the box parts have been initially entered into telescopic engagement, thus providing the initial assembling guiding functions above described. Also in each of the different embodiments, the caulking bead is tapered at its entering or forwardly directed edge so as to provide a wedge-like construction having a wedging function when the parts are moved into telescopic engagement, thus forcing the walls away from each other slightly in opposition to the resiliency of the walls. This relation, as above described, places a permanent yielding pressure upon the caulking bead to make a sift-proof joint which is permanent.

In any of the different embodiments of the invention, the space between the telescoping base and drum flanges is regulated so as to be always of appreciable extent and greater than the manufacturing variation resulting from such variables as quality and thickness of stock, moisture conditions, etc., as above mentioned. Also the caulking bead, no matter what its type or specific structure, will always be made of sufficient thickness to be greater than this space under all normally variant conditions. This provides for the yielding or conforming caulking action with the box parts moved into telescopic engagement with each other. The wedging sealing action between the box parts could also be accomplished or accentuated by providing a flaring structure in the wall part at the edge thereof where the caulking bead enters.

It is also to be understood that, in some aspects of the invention, the shape of the caulking or packing may vary from continuous ring form, an important feature being to close the joint between the base and drum regardless of the shape of packing required to do so.

Certain of the subject matter of this application is disclosed in applicants' prior copending application Serial No. 756,447, filed December 7, 1934. The present application, therefore, is a continuation in part of the earlier application.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

Having described our invention, what we claim as new and desire to secure by Letters Patent is:

1. A method of making boxes, including, making two paper box parts each with continuous or endless walls adapted to telescope with each other, and making the outer diameter of the inner telescopic part sufficiently less than the inner diameter of the outer telescopic part so that said parts telescope loosely with a space therebetween under variant conditions of material going into the box parts and of moisture therein, placing in fixed position on the cooperative telescopic surface of one of said box part walls a readily conformable caulking bead extending entirely around said cooperating telescopic surface, and subsequently placing said walls into telescopically engaging relation with each other and at the same operation entering the caulking bead between the box part walls with a wedging action and conforming it to caulk the space between the outer and inner box parts occasioned by the different diameters thereof.

2. A method of making boxes including, making a box part of laminated structure having relatively superposed layers of paper so that the walls thereof will telescope with another box part, making the outer diameter of the inner telescopic part sufficiently less than the inner diameter of the outer telescopic part to provide a material space between the parts under normal variant conditions of thickness of paper going into the laminated box part and of moisture therein, placing in fixed position on the cooperative telescopic surface of one of said box part walls a caulking bead of readily conformable structure so as to extend entirely around said cooperating telescopic surface, and subsequently placing said walls into telescopically engaging relation with each other, and at the same operation entering the caulking bead into said space with a wedging action to caulk the space between the outer and inner box parts.

3. The method of making and assembling a paper powder box having a base section and a powder-containing drum with a frangible head and opposite open end, which includes: making the resilient paper walls of the base section and of the powder-containing drum for telescopic engagement with each other with the outer diameter of the inner telescopic wall sufficiently less than the inner diameter of the outer telescopic wall so that said walls will telescope with enough space therebetween to provide for loose, easy entry of one into the other; forming a yieldable elevation or ridge slightly thicker than the space between said walls and extending around the telescopically engaging surface of one of said walls; entering the end of one of said walls into telescopic relation with the other wall and utilizing the loosely engaging parts thereof to guide the drum and base into telescopically assembled relation with each other prior to engagement of the ridge between the walls; and subsequently, while the walls are being moved into fully telescoped relation with each other, entering the ridge into engagement with the companion wall and forcing said ridge with a wedging action into tightly engaging position between the walls so as to compress the ridge to cause it to conform to the walls and space, and to urge the walls away from each other slightly in opposition to the resiliency thereof, thus to maintain constant pressure on said ridge and to maintain a tight joint.

4. The method of making and assembling a paper powder box having a base section and a powder-containing drum with a frangible head and opposite open end, which includes: making the resilient paper walls of the base section and of the powder-containing drum for telescopic engagement with each other with the outer diameter of the inner telescopic wall sufficiently less than the inner diameter of the outer telescopic wall so that said walls will telescope with enough space therebetween to provide for loose, easy entry of one into the other; forming a yieldable elevation or ridge slightly thicker than the space between said walls and extending around the telescopically engaging surface of one of said walls; filling said powder-containing drum with powder through its open end prior to assembly with the base section; entering the open end of the wall of the filled drum into telescopic relation with the other wall and utilizing the loosely engaging parts thereof to guide the drum and base into telescopically assembled relation with each other prior to engagement of the ridge between the walls; and subsequently, while the walls are being moved into fully telescoped relation with each other, entering the ridge into engagement with the companion wall and forcing said ridge with a wedging action into tightly engaging position between the walls so as to compress the ridge to cause it to conform to the walls and space, and to urge the walls away from each other slightly in opposition to the resiliency thereof, thus to maintain constant pressure on said ridge and to maintain a tight joint.

ALEXANDER H. DREUX.
JOSEPH N. ROYAL.